May 7, 1940.   P. H. CHASE   2,199,658
ELECTRIC PROTECTIVE SYSTEM
Filed Nov. 25, 1938   9 Sheets-Sheet 1

Philip H. Chase, Inventor.
Haynes, Koenig and Wolf, Attorneys.

May 7, 1940.    P. H. CHASE    2,199,658
ELECTRIC PROTECTIVE SYSTEM
Filed Nov. 25, 1938    9 Sheets-Sheet 3

Philip H. Chase,
Inventor.
Haynes, Koenig and Wolf,
Attorneys.

May 7, 1940.   P. H. CHASE   2,199,658
ELECTRIC PROTECTIVE SYSTEM
Filed Nov. 25, 1938   9 Sheets-Sheet 4

Philip H. Chase,
Inventor.
Haynes, Koenig and Wolf,
Attorneys.

May 7, 1940.   P. H. CHASE   2,199,658
ELECTRIC PROTECTIVE SYSTEM
Filed Nov. 25, 1938   9 Sheets-Sheet 5
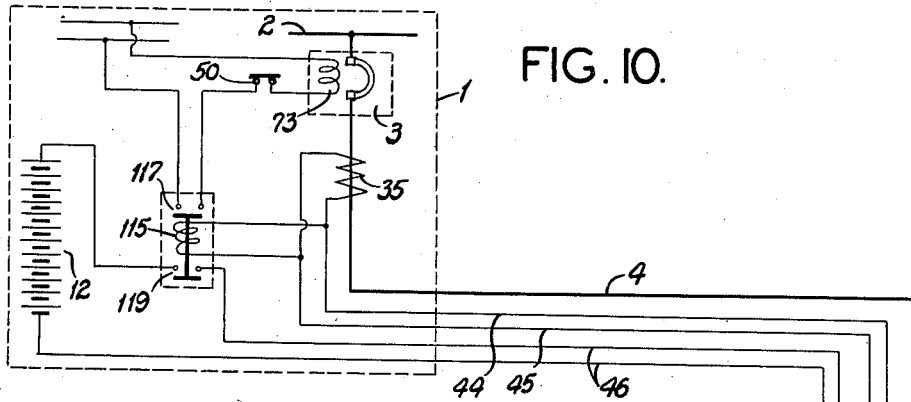
FIG. 10.
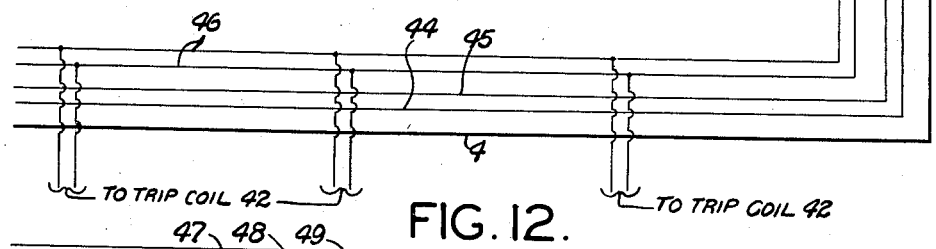
FIG. 12.
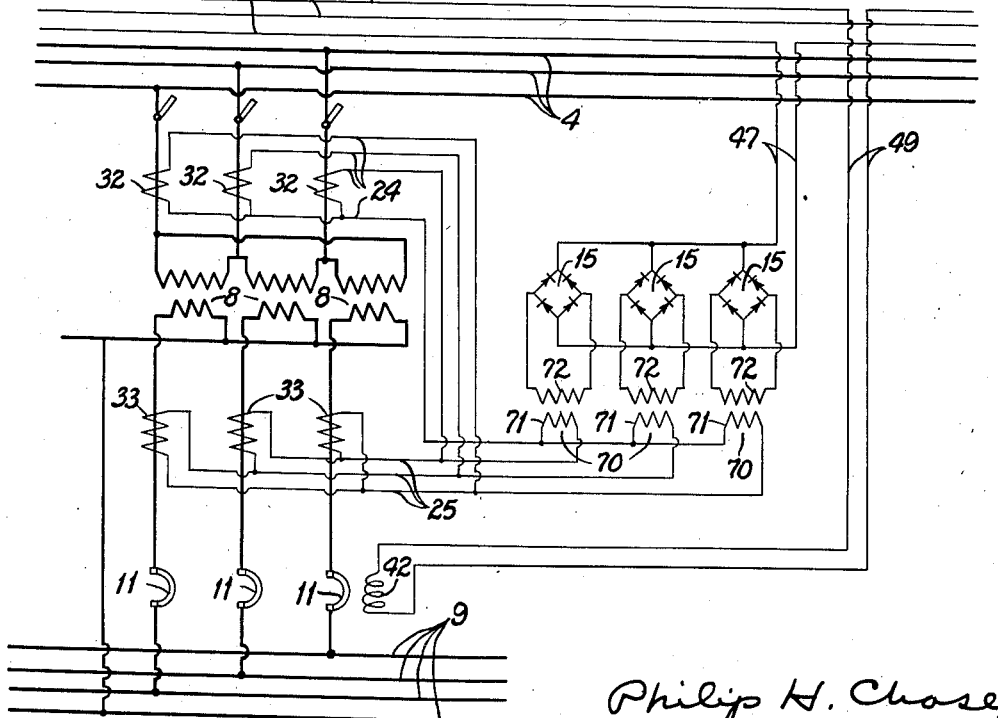
Philip H. Chase,
Inventor.
Haynes, Koenig and Wolf,
Attorneys.

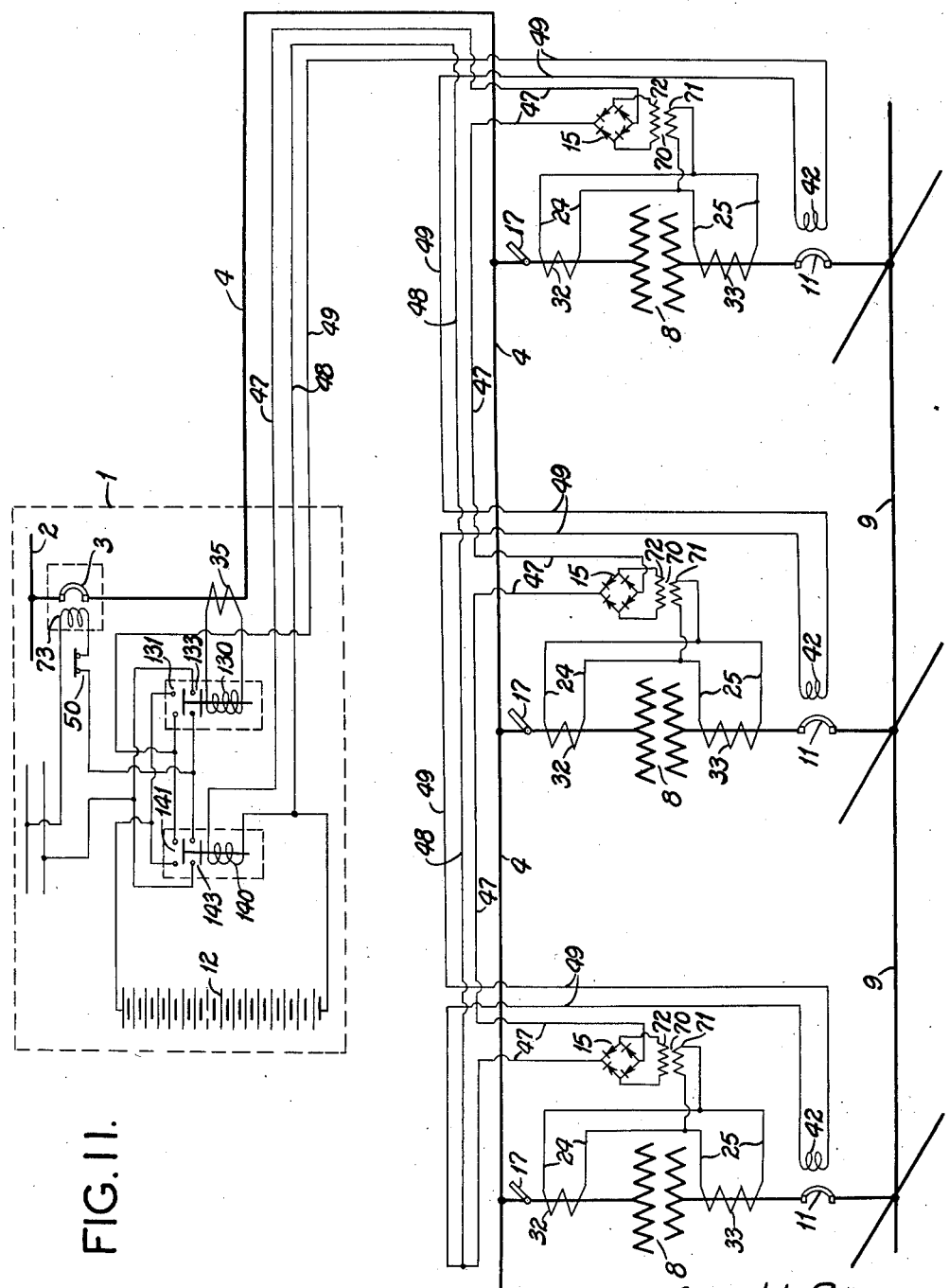

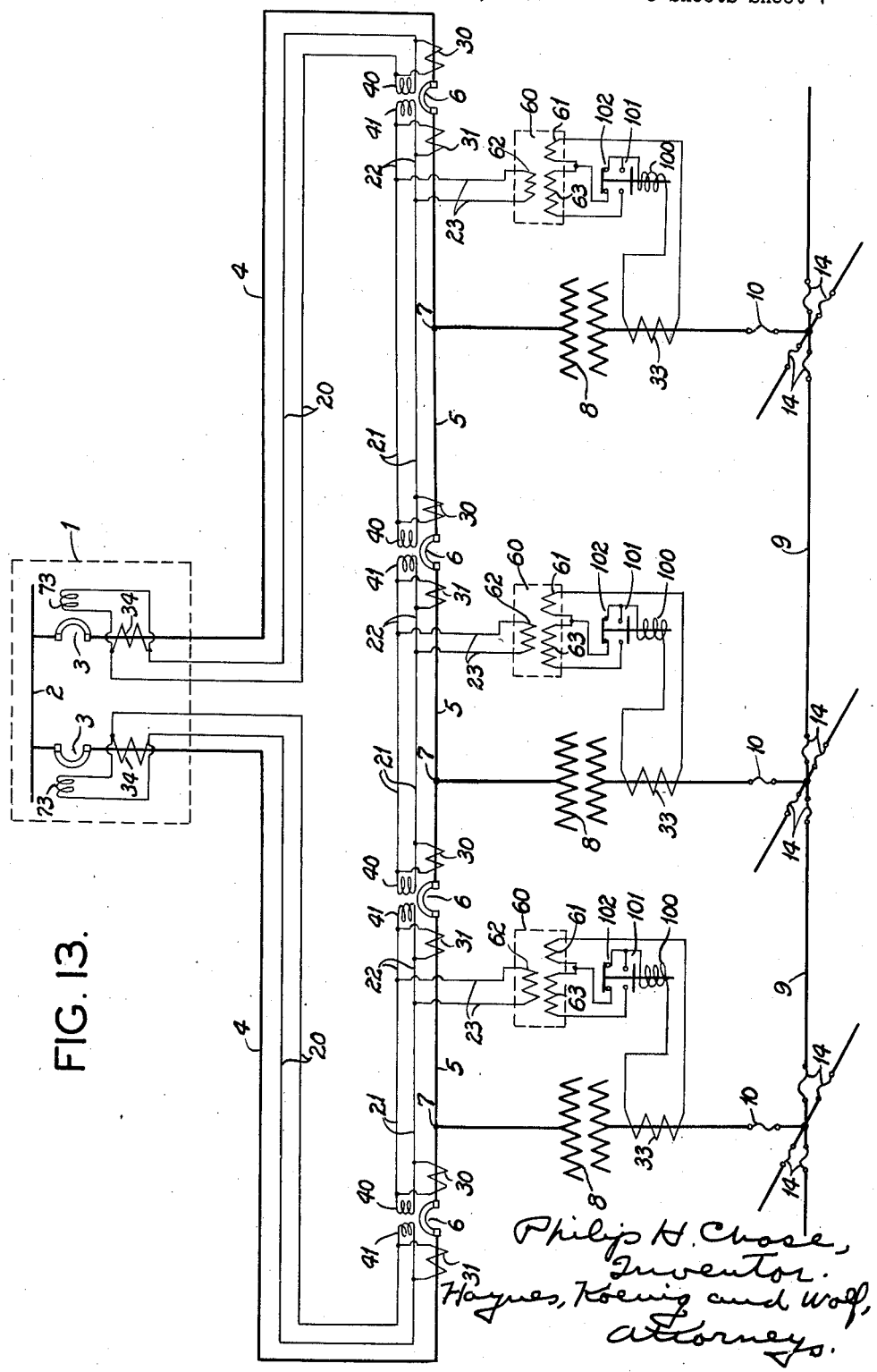

May 7, 1940.                P. H. CHASE                2,199,658
                    ELECTRIC PROTECTIVE SYSTEM
                  Filed Nov. 25, 1938        9 Sheets-Sheet 8

Philip H. Chase,
        Inventor.
Haynes, Koenig and Wolf,
        Attorneys.

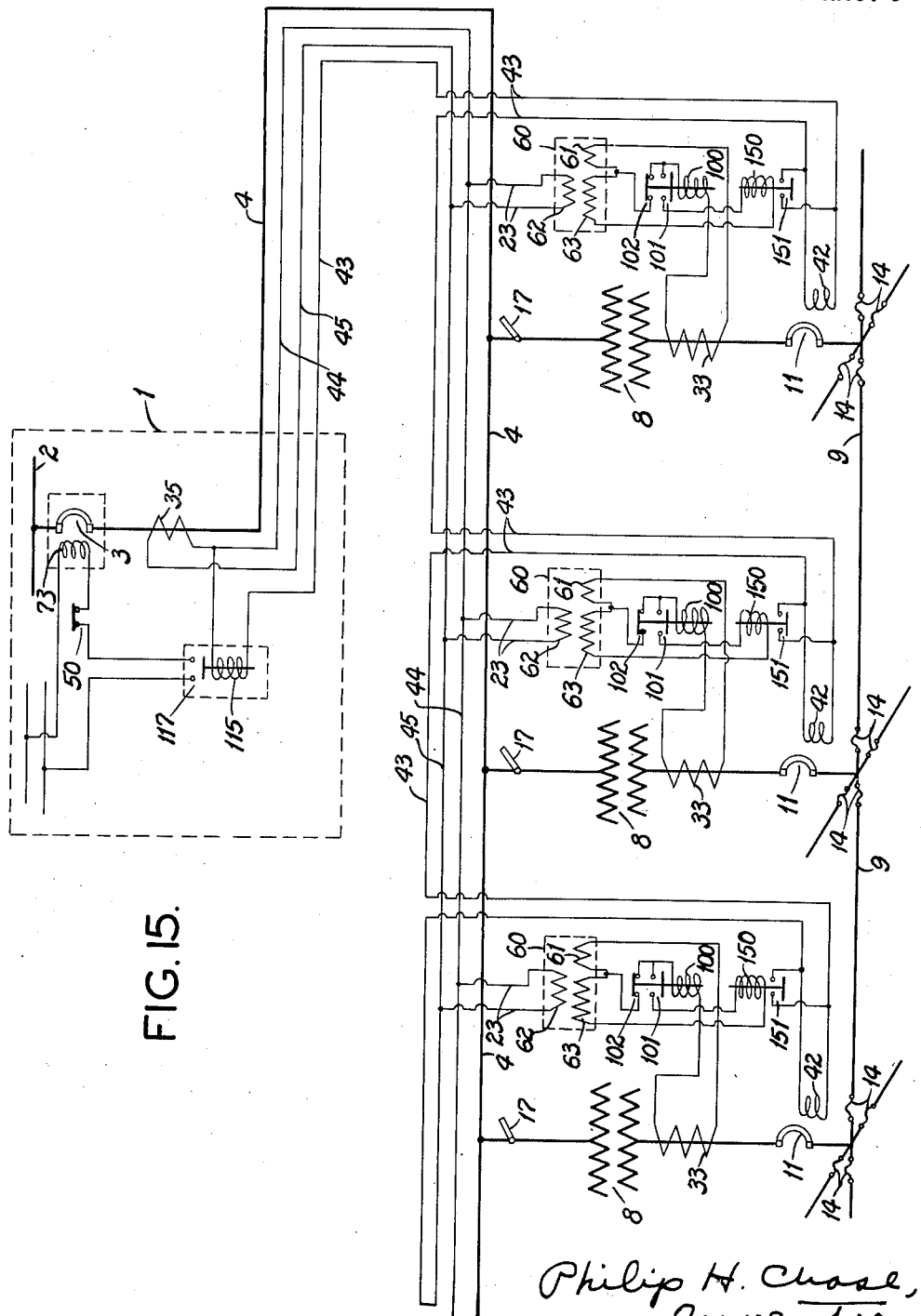

Patented May 7, 1940

2,199,658

UNITED STATES PATENT OFFICE 2,199,658

ELECTRIC PROTECTIVE SYSTEM

Philip H. Chase, Bala Cynwyd, Pa.

Application November 25, 1938, Serial No. 242,233

20 Claims. (Cl. 175—294)

This invention relates to electric protective systems, and with regard to certain more specific features, to such systems for low-voltage, alternating-current, distribution networks supplied from a plurality of transformer taps on one or more distribution feeders.

The invention among other things is an improvement upon the electric distribution system of my United States Patent 1,543,370, dated June 23, 1925, for Electric distribution system.

Among the several objects of the invention may be noted the provision of means to provide an improved protective system for multiple-fed alternating-current distribution networks; to provide a highly sensitive protective system under fault conditions in distribution transformers; to provide a protective system which operates with a predetermined degree of sensitivity on primary feeder faults and a predetermined higher degree of sensitivity on transformer faults; to provide different degrees of sensitivity of fault protection on the various branches of a circuit; to safeguard against the extended development after inception of faults in apparatus and equipment; to provide simple and effective means for isolating sections of an electric power generation, transmission or distribution system and thereby minimize interruptions due to failure of equipment, feeders, or mains; and the attainment of a high degree of reliability of service with a small number of simple protective and circuit-interrupting devices. Other objects will be in part obvious and in part pointed out hereinafter.

The invention accordingly comprises the elements and combinations of elements, features of construction, and arrangements of parts which will be exemplified in the systems and structures hereinafter described, and the scope of the application of which will be indicated in the following claims.

In the accompanying drawings, in which are illustrated several of various possible embodiments of the invention, Fig. 1 is a simplified schematic, single-phase wiring diagram of a loop-feeder embodiment of the invention in which current transformers are used in the primary and secondary leads respectively of transformer tap sections;

Fig. 10 is a fragmentary view illustrating an alternative embodiment of a portion of the Fig. 9 construction;

Fig. 11 is a view similar to Fig. 9 illustrating another embodiment in which rectifying elements are used in connection with certain boosting devices;

Fig. 12 is a full-line, three-phase, schematic diagram illustrating pilot wire connections for a transformer bank of Fig. 11;

Fig. 13 is a view similar to Fig. 1, but illustrating an alternative form of boosting device;

Fig. 15 is a view similar to Fig. 9, but illustrating a radial-feeder embodiment and other alternatives; and, Fig. 16 is a view similar to Figs. 3–8 showing a modification.

Similar reference characters indicate corresponding parts throughout the several views of the drawings.

Figure 1:
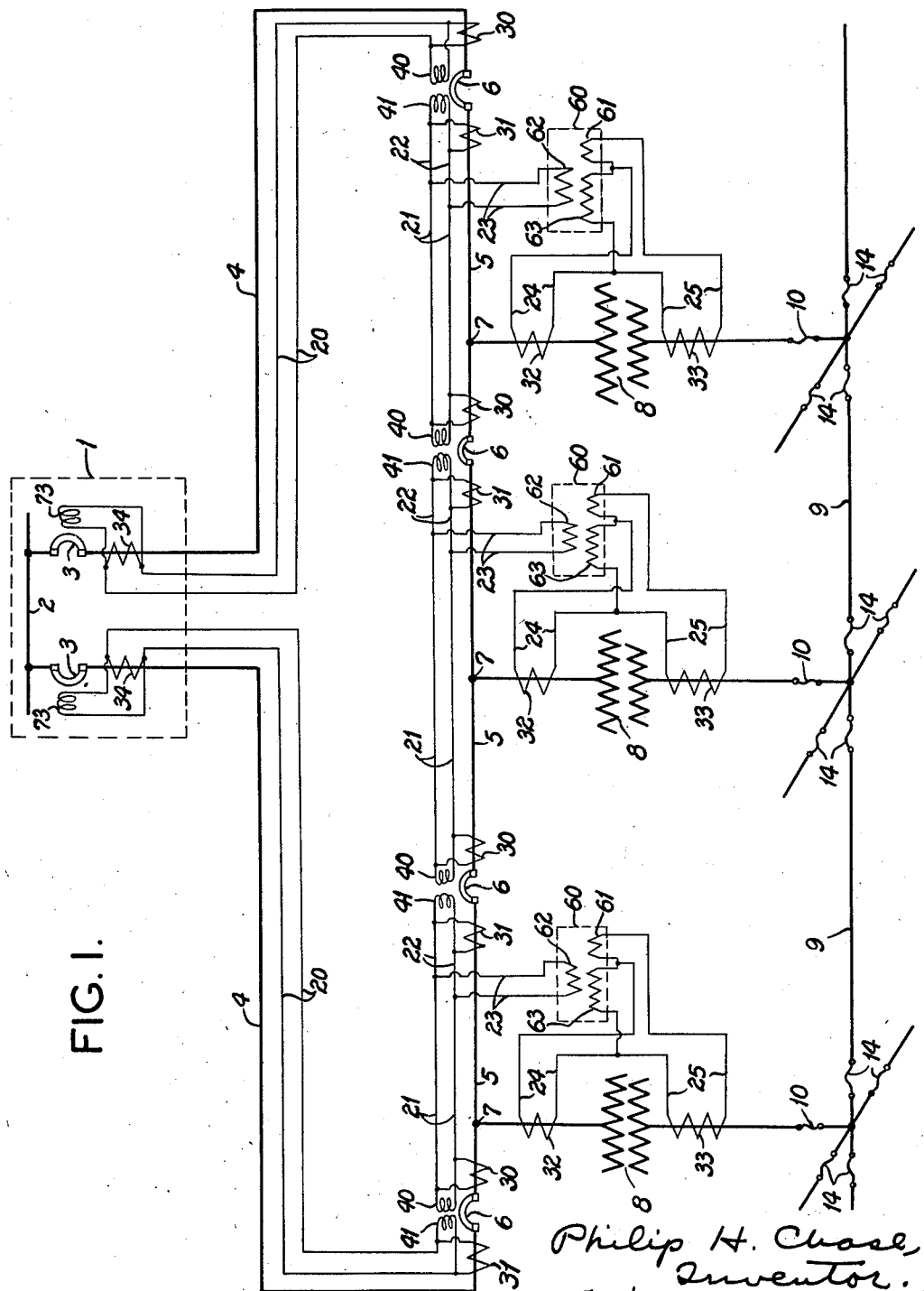

The improvements relate more specifically to systems of low-voltage alternating-current distribution networks supplied from a plurality of primary distribution feeders and transformers, but are also applicable to transmission and to power station and sub-station apparatus, buses, etc.

In any interconnected electric distribution system, it is necessary to utilize methods of protection which will discriminate between a fault on one part or section of the system and a fault on another section of the system, so that only the predetermined faulted section of the system will be removed from service at the time of fault.

In electric distribution systems having a high ratio of voltage transformation between the primary feeders and the secondary (lower voltage) mains, there is a wide range between the magnitude of primary fault current resulting from faults on primary feeders and from faults in transformers or on the secondary portions of the system. This situation results in practical difficulties when it is desired to protect primary feeders, or sections of primary feeders, with associated transformers, as units, as is often done in modern low-voltage alternating-current network systems. Transformer faults, particularly on the low-voltage windings of high ratio transformers, require a relatively high degree of protection sensitivity, due to the fault current from the primary feeder being limited by transformer impedance. Primary feeder faults produce a much larger fault current, relatively to the above mentioned transformer faults.

On sectionalized primary loop feeder systems, protected by a balanced circulating current pilot wire system, and in which the transformer is included as a part of the feeder section, it is advantageous to make the over-all protective system of that feeder section sufficiently sensitive to transformer faults and, at the same time, assure non-operation of the protective system of any section on through faults (faults on some other section) of greater magnitude. Similarly on radial primary distribution feeders, in which the primary feeder and all of its associated transformers are connected as a unit, simple overload protection at the supply end of the primary feeder cannot be entirely depended upon for prompt action in the case of transformer faults, since the primary current resulting from such faults often is only a small percentage of the full load rating of the feeder until the fault has developed to an undesirable magnitude.

Thus, under some conditions it is insufficient merely to include the primary feeder, or feeder section, and associated transformer banks, or bank, in a common overload protective system, or differential section of the pilot wire circuit, on account of the wide range of sensitivity required on transformer faults and primary feeder faults.

It is therefore evident that a protective system designed to isolate primary feeders, or sections of primary feeders, and their associated transformers, or generally to isolate apparatus, buses, sections of circuits and the like, should have a high level of response to the various types of faults which produce a wide range in the magnitude of fault current, and at the same time should discriminate between local faults and through faults.

One of the objects of this invention, namely, to provide a high degree of sensitivity for transformer faults, is accomplished by unique arrangements of circuits and equipment whereby the over-all protective scheme may be made highly sensitive to a transformer fault and also discriminate between a local fault and a through fault.

Referring now more particularly to Fig. 1 of the drawings, there is illustrated at 1 a substation supplying an electric distribution system, through substation circuit-breakers 3, feeders 4, and feeder sections 5. The feeder sections 5 are connected in series with each other and the feeders 4 by means of section circuit-breakers 6, thus together forming a loop feeder with supply from the substation at both ends under normal conditions.

Figure 2:
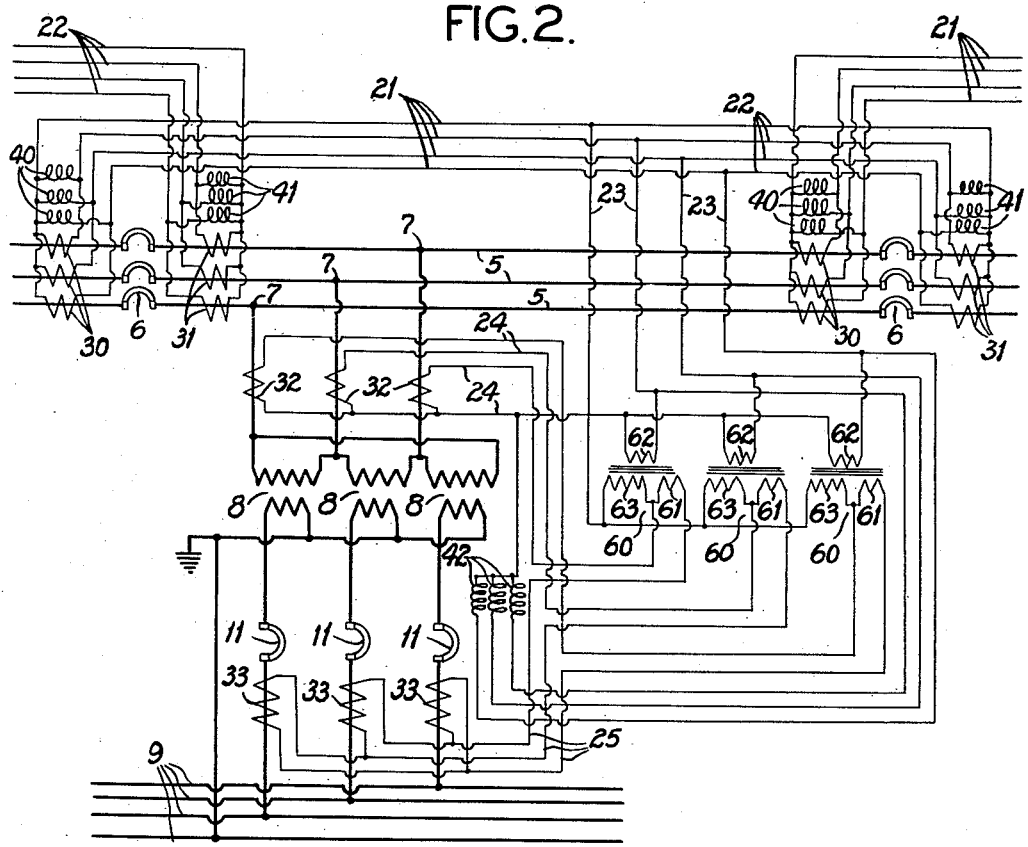
Fig. 2 is a full-line schematic wiring diagram of a tap section illustrating a three-phase circuit, an overlapping protection scheme and secondary circuit breakers.
Figure 3:
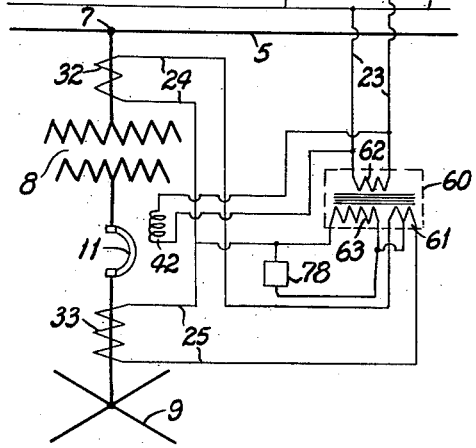
Figs. 3–8 are simplified schematic, single-phase wiring diagrams illustrating various modifications of the apparatus associated with the tap sections shown in Fig. 1 and other figures.

Each feeder section 5 has a branch tapped at point 7, consisting of a transformer or transformer bank 8, the secondary side of which supplies a load, loads or secondary mains 9, through a circuit-interrupting device which is shown as a fuse 10 (or a circuit breaker 11 as in Figs. 2 and 3, for example).

The balanced circulating current pilot wire protective system of each feeder section 5 consists of three branches 21, 22 and 23, corresponding to the three branches of the feeder section around point 7 where the transformer or transformer bank 8 is connected to the primary feeder section 5.

The pilot wire system for each feeder section 5 in its simplest form, as described in said Patent No. 1,543,370, has one current transformer per phase in each of the three branches, for example such as transformers 30, 31 and 33 herein. In the patent, as herein, current transformers 30 and 31 are connected through pilot wires 21 and 22. In the patent, wires such as 23 herein form a connection to a single current transformer (such as 33 herein) in the secondary side of a transformer bank (such as 8 herein). But the connection in the patent is by means over which the connection herein is improved, to provide the desired advantages.

Herein 32 and 33 are current transformers on the primary and secondary leads, respectively, of the transformer or transformer bank 8. The secondaries of current transformers 32 and 33 are connected aiding through wires 24, 25 to form a two-way circulating current differential circuit between the primary and secondary sides of transformer or transformer bank 8.

The current from current transformer 33 (which normally is the circulating current between current transformers 32 and 33) is passed through winding 61 of a three-winding auxiliary current transformer 60. A second winding 62 of the three-winding current transformer 60 is connected to the main pilot wire circuit through wires 23 in order to maintain a three-way current balance with the other two branches 21 and 22 of the feeder section. The third winding 63 of the three-winding current transformer has a greater number of turns than winding 61 or 62 and is connected across substantially equi-potential points of the two-way differential circuit 24, 25 connecting current transformers 32 and 33. Transformer 60, as is the case with its equivalents herein, may be referred to as a tap unbalance boosting device. As illustrated in Fig. 1, winding 63 is connected to one end of winding 61 of the three-winding auxiliary transformer 60. Alternatively, connection of winding 63 to the mid-point of winding 61 may be utilized under conditions where it is desired to connect 63 more exactly across equi-potential points of the differential circuit comprising current trnsformers 32 and 33 and thus secure a more precise balance under through fault conditions. This alternative connection for winding 63 is illustrated in Fig. 3 in connection with other alternative features to be described. It is obvious that alternatively winding 63 may be connected to the end of winding 61 toward the end of current transformer 33; instead of to the end of winding 61 toward current transformer 32, as is illustrated in Fig. 1.

Under the condition of normal operation, or condition of a through fault, the relative polarity of the current transformers 30, 31, 32 and 33, and the three-winding transformer, is such that circulating currents flow in pilot wires 21, 22, 23, 24 and 25 and in windings 61 and 62 of the three-winding transformer 60, with zero or negligible current in winding 63 and in the trip coils 40 and 41. Coils 63, 40 and 41 have high enough impedances for the purpose.

In the event of a fault in transformer or transformer bank 8, there is a substantial deviation from the normal substantial balance of current from transformers 32 and 33, and current is caused to flow through winding 63 of the three-winding transformer 60. The ratio of winding 63 to winding 62 is such that the differential current from current transformers 32 and 33 is multiplied or boosted and fed into the pilot wire circuit over wires 23, 22 and 21 to operate trip coils 40 and 41 of adjacent feeder sectionalizing breakers 6. In other words, the ratio of current transformation between coils 63 and 62 is greater and preferably several times that between coils 61 and 62. The tripping of breakers 6 isolates only the faulted transformer and its feeder section from the primary feeder. The secondary circuit-interrupting device 10 (which is illustrated as a fuse, but may be a circuit breaker operated by trip-coils similarly to breakers 6) disconnects the faulted transformer from the low-voltage network mains 9. In case fuse 10 is used as a circuit-interrupting device in the secondary leads of transformer 8, its time-current characteristic is such as to assure its blowing subsequent to tripping of primary feeder sectionalizing breakers 6. Also, the time-current characteristics of fuse 10 and fuses 14 (if utilized) are coordinated to assure the blowing of fuse 10 prior to fuses 14 on primary feeder or transformer fault, and to assure the blowing of fuses 14 prior to fuse 10 on a fault on a low-voltage main 9.

In the event of a fault in a feeder section 5, external to transformer or transformer bank 8, there will, of course, be no relative reversal of polarity between current transformers 32 and 33. The relatively polarity of current transformers 30 and 31 and winding 62 of the three-winding transformer will, however, be such as to cause the sum of their respective currents to flow through the trip-coils 40 and 41, and trip the breakers 6 at each end of the faulted feeder section.

Current transformers 32 and 33 have relative ratios which are directly proportional to the primary and secondary currents respectively of transformer or transformer bank 8. Any desired degree of sensitivity on transformer faults is obtainable by the selection of the ratios of current transformers 32 and 33, and the ratio of windings 63 and 62 of the three-winding transformer 60. The ratio of windings 61 and 62 of the three-winding transformer 60 is determined by the relative ratios of the current transformers 32 and 33 to the current transformers 30 and 31.

It will be noted that this embodiment provides, in effect, a two-way balanced differential circuit between the primary and secondary sides of the transformer bank and a two-way balanced differential circuit between the two ends of the primary feeder section. These two, two-way differential circuits are connected together through windings of proper ratio in the auxiliary three-winding current transformer. This arrangement permits the selection of one degree of sensitivity for transformer faults and of another degree for primary feeder faults, each independent of the other, and retains the advantages of controlling the primary feeder section and transformer bank as a unit in the protective scheme.

The same methods are applicable for the protection of apparatus, equipment and circuits having a multiplicity of branches or terminals, such, for example, as three-winding (primary, secondary and tertiary) transformers and bus sections comprising a plurality of feeders and sources.

Fig. 2 is a full-line schematic diagram of a feeder section of Fig. 1 for a three-phase circuit, except that a secondary circuit-breaker and "overlapping" protection are also illustrated.

Fig. 2 illustrates a delta-Y connected transformer bank, but other polyphase connections may be utilized. In the overlapping protection, the current transformers 30, 31 utilized for the protection of a given feeder section are located on the far side (in relation to that feeder section) of the primary circuit-interrupting devices 6 and the far side of the secondary interrupting device 11. As the circuit-interrupting devices 6 are comprised within the protective systems of adjacent feeder sections, should a fault develop in one of them, isolation of the faulty circuit breaker is secured by the functioning of the protective systems of the two feeder sections which overlap that faulty breaker.

The secondary circuit breaker 11 is also overlapped by the protective system. This circuit breaker may be alternative to the fuse 10 of Fig. 1, or the fuse may be included as a safeguard against failure of the breaker 11 to trip under local faults. The secondary circuit breaker is opened by the trip coils 42 which are connected across the main pilot wire circuit and are energized at the time of a primary feeder or transformer fault, similarly to trip coils 40 and 41 of primary section breakers 6. Since the back-feed from the low-voltage mains is the principal source of tripping energy on some transformer faults, it is preferable that secondary breaker 11 should trip subsequent to primary feeder sectionalizing breakers 6, a feature provided, for example, by time-delay in operation of the trip coils 42 or in the mechanism of breaker 11. It is evident that this "overlapping" feature of the protective system is applicable to the various other embodiments herein described.

Fig. 3 illustrates by single-line diagram, the use of a circuit breaker 11 in place of a fuse between transformer bank 8 and the low-voltage mains 9, and also a harmonic filter 78 in the protective system. It also shows the winding 63 connected across more exact equi-potential points by being connected to the mid-point of winding 61. This feature has been above referred to.

Under some conditions, particularly where high protective sensitivity is desired, a harmonic filter 78 may be included, tuned to by-pass around coil 63, for example, components of current which are characteristic of certain transient conditions to which the protective system generally should be insensitive.

Figs. 4, 5, 6, 7, 8, and 16 illustrate other methods which may be used to connect the two-way differential circuit across the transformer bank, to the main pilot wire circuit through an auxiliary current transformer.

Figure 4:
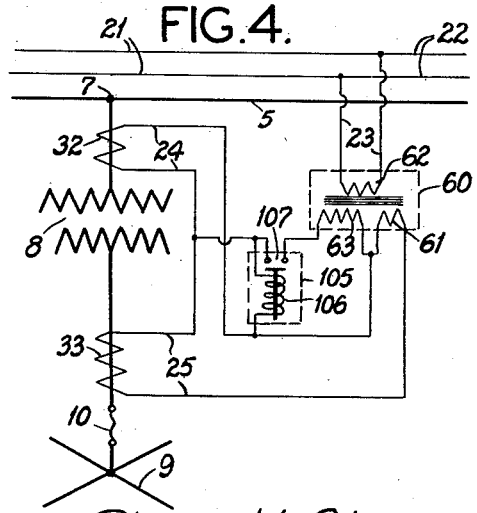

Fig. 4 illustrates a relay 105 with its winding connected across the normally equi-potential points of the two-way differential circuit 24, 25. The booster winding 63 of the three-winding transformer is connected across the two-way differential circuit through the contacts 107 of relay 105, which contacts are closed upon operation of the relay due to occurrence of a transformer fault.

It is obvious that the relay coil 106 may be connected through a supplemental set of contacts (circuit-opening) so that when local fault conditions occur the relay coil ceases to be a path in shunt with winding 63. In this case the relay 105 should lock out when it operates. The relay 105 has proper time-current characteristics to secure a high degree of sensitivity on transformer faults and avoid faulty operation due to inaccuracies of current transformers on high current through faults, or to other transit conditions.

A harmonic filter, such as is referred to in connection with Fig. 3, may be included in shunt with the coil 106 of relay 105 in order to prevent operation of the protective system due to transient non-fault conditions, and yet retain a high degree of sensitivity under local faults.

Figure 5:
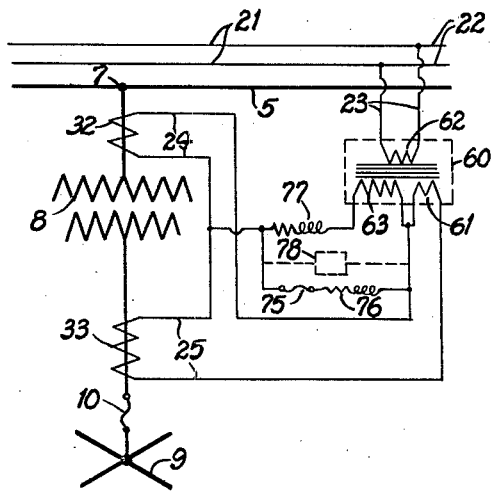

Fig. 5 illustrates a fuse 75 in parallel with booster winding 63 of the three-winding transformer. The blowing of the fuse under transformer fault conditions makes booster winding 63 operative as herein above described. The fuse, with proper time-current characteristics, together with impedance 76 in series with the fuse and impedance 77 in series with booster winding 63 are coordinated in their characteristics to render the protective system highly sensitive to transformer faults and insensitive to through faults and to other transient conditions. Thus, under local fault conditions, fuse 75 blows before secondary fuse 10 (if used) blows.

In some cases impedance 77 may be omitted, and merely fuse 75 utilized, preferably in series with impedance 76. Impedance 76, and impedance 77 if included, minimize the diversion (through winding 63 short-circuited through fuse 75) of tripping energy from the trip coils 40, 41 (and 42 if included) connected across the pilot wires 21, 22 and 23 appurtenant to the feeder section when faulted.

The impedances 76 and 77 may comprise simple resistance, or both resistance and inductive reactance. The impedance 76 may also include capacitive reactance to comprise a harmonic filter, preferably to block the passage of components of current which are characteristic of certain transient conditions under which the fuse should not operate, and in this case the by-pass filter 78 of Fig. 3 should preferably be included.

Figure 6:
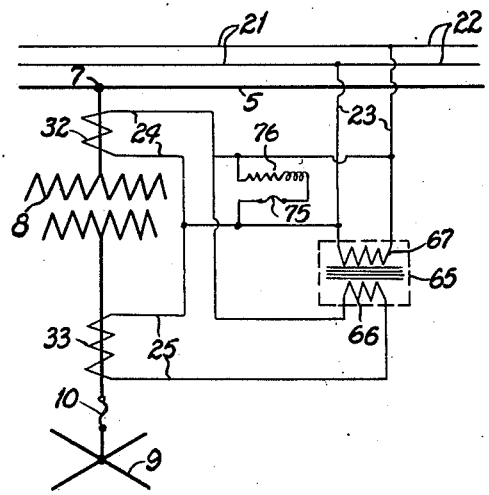

Fig. 6 illustrates a method by which the differential current from current transformers 32 and 33 may be supplied conductively, instead of inductively, to the main pilot wire circuit. The substantially equi-potential points of the two-way differential circuit 24, 25 are connected directly to the pilot wire 23 and are also bridged by fuse 75 in series with impedance 76. The purpose of impedance 76 is the same as previously described in connection with Fig. 5.

The relative polarities of current transformers and ratio of two-winding auxiliary current transformer 65 are such that balanced conditions are maintained in the pilot wire circuit under normal operation as previously described.

In the event of a fault in transformer bank 8, the differential current from current transformers 32 and 33 blows fuse 75, thus permitting the differential current from current transformers 32 and 33 to flow into the main pilot wire current for operation of the trip coils. The equivalent of the boosting effect of winding 63 of the hereinabove described inductive method (Figs. 1 to 5) may be secured by selection of lower ratios of current transformers 32 and 33.

A relay similar to relay 105 of Fig. 4, with its winding connected across normally equi-potential points of the two-way differential circuit 24, 25 and its contacts arranged to direct the differential current from current transformers 32 and 33 into pilot wires 23, may be used in place of fuse 75.

Figure 16:
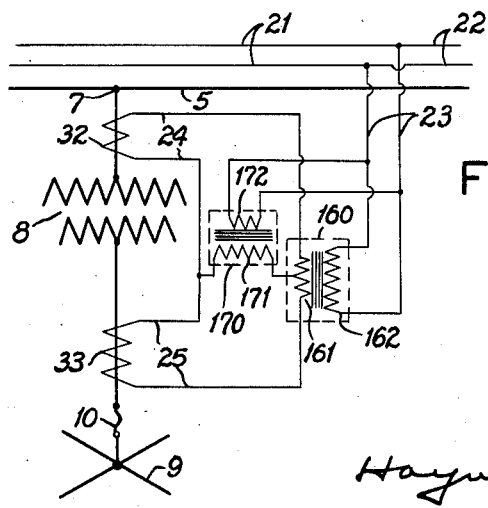

Fig. 16 illustrates the use of two separate auxiliary current transformers 160 and 170 as a means for maintaining a balance between the differential circuit across the transformer bank and the differential circuit of the primary feeder section under normal or through fault conditions, and multiplying the current output of current transformers 32 and 33 under condition of a fault in transformer bank 8. Auto-transformers may be used in place of the two-winding transformers illustrated.

The operation is similar to that previously described for the three-winding auxiliary transformer 60. The ratio of winding 161 to winding 162 of transformer 160 is determined by the relative ratios of current transformers 32, 33 and feeder section current transformers 30, 31. The mid-tapped winding 161 is in series with the normally balanced circulating current circuit 24, 25, and winding 171 of auxiliary transformer 170 is connected across substantially equi-potential points of said circuit. However, under some conditions the connection of winding 171 may be made to one or the other end of winding 161 instead of to the mid-point, for reasons already made clear herein.

Under the condition of normal operation or through fault, the relative polarities of the associated current transformers and windings 161 and 162 of auxiliary transformer 160 are such that circulating currents flow in the various branches of the pilot wire circuit with zero or negligible current through the trip coils and windings 171 and 172 of auxiliary transformer 170. In the event of a fault in transformer bank 8, the differential current from current transformers 32 and 33 flows through winding 171 of auxiliary transformer 170. This differential current is multiplied because of the ratio of windings 171 to 172 and is fed into the main pilot wire circuit over wires 23 for operating the circuit-interrupting devices.

Figure 7:
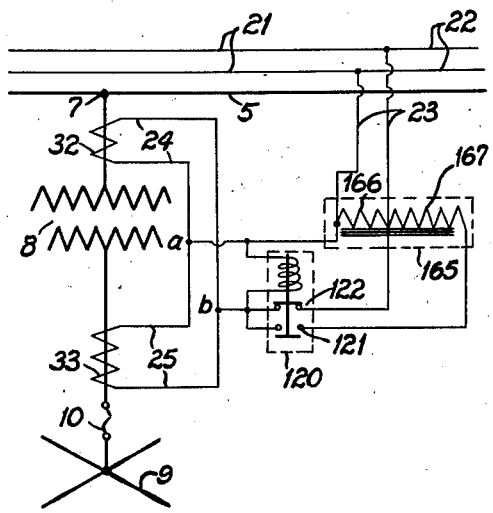

Fig. 7 illustrates another means whereby the differential current output from current transformers 32 and 33 may be multiplied under certain conditions and fed into the main pilot wire circuit for operating circuit-interrupting devices, but in which the auxiliary transformer 165 is not used for maintaining a balance between the differential circuit across the transformer bank and the differential circuit of the primary feeder section.

The ratios of current transformers 32 and 33 relative to each other and to the feeder section current transformers 30 and 31, are such that, under condition of normal operation or through-fault, their secondary currents are unequal by the amount required to balance the component of current in the main pilot wire circuit corresponding to the primary current of the transformer bank. Pilot wires 23 are connected directly to the differential circuit across the transformer bank at points a and b. The winding of voltage relay 120 and winding 166 of auto-transformer 165 are also connected across points a and b.

In the event of a fault in transformer bank 8, there will be a voltage across points a and b in excess of that required to maintain a balance between the above-mentioned two differential circuits. A predetermined value of such excess voltage across points a and b will operate voltage relay 120, closing contacts 121 and opening contacts 122 (close before open). The closing of contacts 121 closes the normally open circuit of winding 167 of auto-transformer 165. The differential current of current transformers 32 and 33 is multiplied by auto-transformer 165 and appears in the pilot wire circuit over wires 23 for operating the circuit-interrupting devices.

Harmonic filter 78 of Fig. 5 may be included. A two-winding transformer, such as is illustrated in Fig. 6, may be used in place of an auto-transformer.

In many of the embodiments described herein, continuous-winding transformers may be used for connecting between the current transformers and the pilot wire system instead of transformers with relatively insulated windings.

Figure 8:
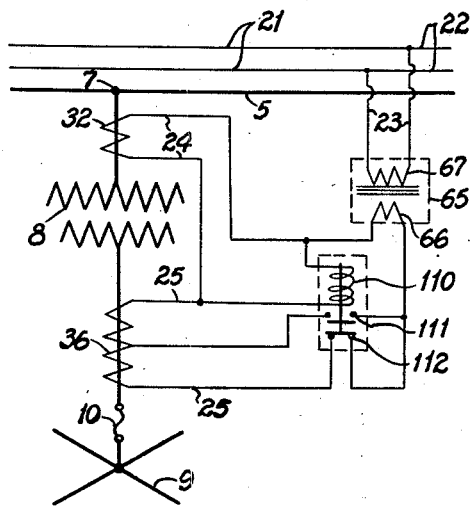

Fig. 8 illustrates the use of an auxiliary current transformer 65 with only two windings. Current transformer 36 in the secondary leads of transformer bank 8 has a dual ratio. The boost in current for operation of trip-coils, on occurrence of a transformer fault, is obtained by operation of relay 110 which has its winding connected to the normally equi-potential points of the two-way differential circuit across transformer bank 8. Operation of relay 110 on a transformer fault closes contacts 111 and opens contacts 112 (close before open). The closing of contacts 111 and opening of contacts 112, lowers the ratio of current transformer 36. The resulting increased current from current transformer 36 is fed into the pilot wire circuit through windings 66 and 67 of auxiliary transformer 65. The relay 110 has proper time-current characteristics to secure a high degree of sensitivity on transformer faults and avoid faulty operation due to inaccuracies of current transformers on high current through faults or to other transient conditions.

Figure 9:
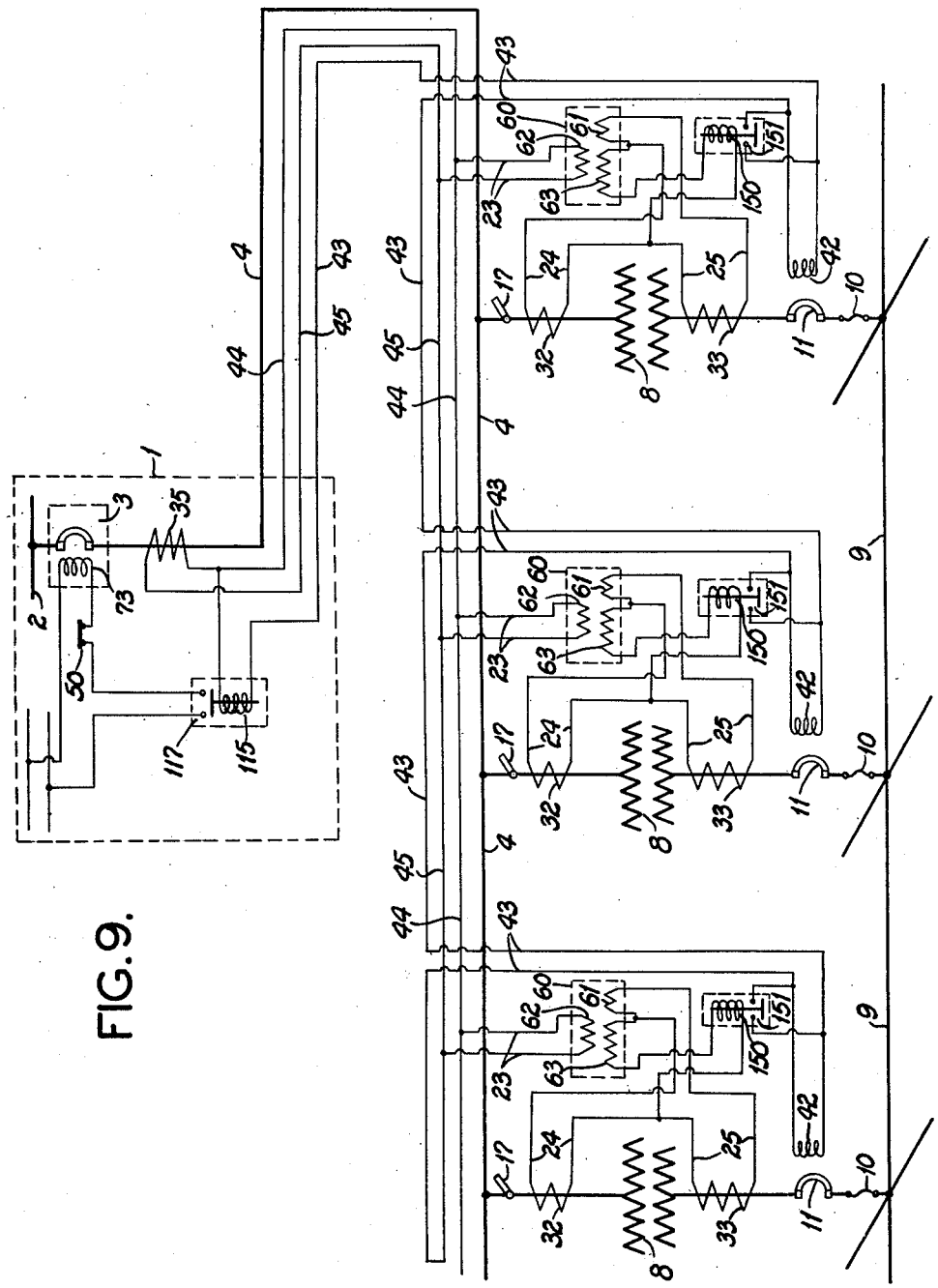
Fig. 9 is a simplified schematic, single-phase wiring diagram of a radial-feeder embodiment of the invention in which current transformers are used in the primary and secondary leads respectively of transformer tap sections.

Fig. 9 is a single-line schematic diagram to illustrate an embodiment of the invention applied to a radial primary distribution feeder and transformers, in which the entire primary feeder and all of its associated transformers are controlled as a unit in the protective scheme.

There is illustrated at 1 a substation supplying an electric distribution system (one feeder shown) comprising substation circuit breaker 3, radial primary feeder 4, distribution transformers or transformer banks 8, low-voltage circuit breakers 11 and secondary mains 9, generally networked.

The entire primary feeder and all of its associated transformers or transformer banks are protected by a multi-branch balanced circulating current pilot wire system on which 35 is a current transformer in the supply end of the primary feeder. Numerals 44 and 45 indicate pilot wires paralleling primary feeder 4, and 32 and 33 are current transformers in the primary and secondary leads, respectively, of each of the transformers 8. On each of the transformers 8, current transformers 32 and 33 are connected (through wires 24 and 25) to form a two-way current differential circuit between the primary and secondary sides, and the circulating current between current transformers 32 and 33 is passed through winding 61 of the three-winding current transformers 60. A second winding 62 of the three-winding transformer 60 is connected to the main pilot wire circuit 44 and 45 through wires 23 so that a current balance is maintained in the pilot wire circuit corresponding to the current of the main primary feeder and each of its branches to transformers 8. The third winding 63 of the three-winding current transformer 60 is connected across normally equi-potential points of the two-way differential circuit 24, 25 connecting current transformers 32 and 33. The ratios of current transformers 32 and 33 are directly proportional to the primary and secondary currents respectively of transformer bank 8.

In the event of a fault in any transformer 8, there is a reversal (or change) from the normal relative polarity of current transformers 32 and 33, and current flows through winding 63 of the three-winding transformer 60 and coil of relay 150 associated with the faulted transformer or transformer bank 8. The ratio of winding 63 to winding 62 is such that the differential current from current transformers 32 and 33 is multiplied and fed into the main pilot wire circuit 44, 45 over wires 23. Thereto are also added the current from current transformer 35 and from current transformers 33 (through windings 61 and 62 of their respective three-winding transformers 60) of other transformers 8 on the same feeder. The resultant current energizes coil of relay 115 in the substation and all trip-coils 42 of secondary breakers 11, all of which are connected in series, through wires 43, across wires 44, 45.

The operation of relay 115 closes contacts 117. The closing of contacts 117 energizes trip-coil 73 and trips station feeder breaker 3, thus disconnecting the feeder and all transformers from the substation supply. The tripping of secondary breaker 11 in the secondary leads of each transformer bank connected to the feeder, disconnects all transformer banks of the feeder from the low-voltage mains 9.

It will be noted that the two-way differential circuit of the transformer bank at fault is the major source of tripping energy for relay 115 in the substation and all trip coils 42 of secondary breakers 11. Under some conditions it may be desirable to assure the operation of these devices prior to interrupting the source of the tripping energy. Relay 150 is illustrated as a means of introducing time delay in the opening of secondary breaker 11 of the faulted transformer bank.

The coil of relay 150 is in series with winding 63 of auxiliary three-winding transformer 60 and is therefore energized only upon the occurrence of a fault in the transformer bank with which it is associated. The instantaneous operation of relay 150 closes normally open contacts 151 and short circuits trip coil 42 of breaker 11 in the secondary leads of the faulted transformer. The design of relay 150 is such that contacts 151 open upon a predetermined time delay, even though the relay coil is still energized, and thereupon permit the energization and operation of the trip coil.

In the event of a primary feeder fault, there is, of course, no reversal from the normal relative polarity of current transformers 32 and 33 on the various transformers 8. There is, however, a reversal from the normal relative polarity of current transformer 35 and the windings 62 of the three-winding current transformers associated with each transformer bank 8, which reversal causes current to flow through winding of relay 115 in the substation and all trip-coils 42 of secondary breakers 11, thus disconnecting the faulted primary feeder and all associated transformers from the substation supply and from the low-voltage network as described above for the occurrence of a transformer failure. Fuses 10 may be included as a safeguard supplemental to the breakers 11, and if included, the fuse characteristics should permit normal tripping of breaker 11 with such time delay as may be introduced by relay 150.

The application of this invention to the radial primary feeder system provides, as in the loop feeder system illustrated in Fig. 1, a two-way balanced differential circuit between the primary and secondary sides of each transformer bank connected to the primary feeder. The two-way balanced differential circuit of each transformer bank is connected to the main balanced pilot wire circuit of the feeder through windings of proper ratio on the auxiliary three-winding current transformers. Also, as in the loop primary system, this arrangement permits the selection of any desired degree of sensitivity for transformer faults and primary feeder faults, each independent of the other, by proper choice of ratios of the various current transformers, and ratios of windings of the auxiliary current transformers.

The two-way differential circuit between the primary and secondary sides of the transformer banks of a radial primary feeder system may also be connected to the main pilot wire circuit of the primary feeder by the arrangements as illustrated in single-line schematic diagrams of Figs. 4, 5, 6, 7, 8 and 16, for example.

Referring again to Fig. 9, the trip-coils 42 of secondary breakers 11 and winding of relay 115 may, under some conditions, be connected in parallel instead of in series, and connecting each between wires 44 and 45 directly or through separate pilot wires with provisions for the proper distribution of current between the various trip-coils and the station relay.

Alternatively to the direct (current transformer) trip arrangement of Fig. 9, the trip coils 42 may be connected, as illustrated in Fig. 10, to a separate pair of pilot wires 46 energized only through additional contacts 119 of relay 115, from a control battery for example, and the pilot wire circuit 44, 45 supplies current only to operate relay 115. Relay 115 should be preferably of the lock-out, or manually reset type, so that once it has operated the supply of tripping energy from the substation will continue until all breakers 11 have operated. The trip coils 42 may be connected in parallel as illustrated or alternatively in series. Energizing of trip coils 42 from a source of energy in the substation does not require the use of the time-delay relay 150 shown in Fig. 9.

In Fig. 11 there is illustrated another method of protection, also affording multiple-level sensitivity, applied to radial primary distribution feeders and transformers in which the entire primary feeder and all of its associated transformers are controlled as a unit, utilizing direct current in the protective system.

There is illustrated at 1 a substation supplying an electric distribution system (one feeder shown) comprising substation circuit breaker 3, radial primary feeder 4, distribution transformers or transformer banks 8, low-voltage circuit breakers 11 and secondary mains 9, generally networked.

The primary feeder is provided with overload protection at the substation and the transformer banks are each provided with individual high sensitivity differential protection. The primary feeder and transformer protective systems are so arranged that in the event of a fault, on either the primary feeder or on one of the individual transformer banks, the primary feeder is disconnected at the substation and all transformer banks are disconnected from the low-voltage mains.

Each transformer bank 8 is provided with a two-way balanced circulating current protective circuit consisting of current transformers 32 in the primary leads connected by wires 24 and 25 to current transformers 33 in the secondary leads. A current-voltage transformer (i. e., for example, a transformer having an air gap in the magnetic circuit) 70 has its current winding 71 connected across normally equi-potential points of the differential circuit 24, 25 and its voltage winding 72 is connected to the A.-C. terminals of A.-C. to D.-C. rectifier bridge 15.

The ratios of current transformers 32 and 33 are directly proportional to the primary and secondary currents respectively of transformer bank 8. Under the condition of normal operation, or fault external to transformer bank 8, the relative polarity of current transformers 32 and 33 is such that a circulating current flows in the differential circuit 24, 25 with zero or negligible current in winding 71 of current-voltage transformer 70.

In the event of a fault in a transformer bank 8, there is a reversal (or change) from the normal relative polarity of current transformers 32 and 33, current is caused to flow through winding 71 of current-voltage transformer 70 and there is A.-C. voltage induced in winding 72, substantially in proportion to the current in winding 71. This A.-C. voltage is converted to D.-C. voltage by rectifier 15 and produces a D.-C. current in the series pilot wire circuit consisting of pilot wires 47, 48, all other rectifiers 15 and winding of relay 140 in the substation.

The operation of relay 140 closes its contacts 141 and 143. The closing of contacts 143 energizes trip coil 73 which trips the feeder breaker 3 at the substation, thus disconnecting the feeder and all transformers from the substation supply. The tripping of the feeder breaker 3 opens auxiliary switch 50. A circuit is also completed from the positive terminal of a source 12 (illustrated as a battery) through closed contacts 141 of relay 140, pilot wire 49, all trip coils 42 of secondary breakers 11 and return to negative terminal of D.-C. source 12 over pilot wire 48. The trip coil 42 of each secondary breaker 11 is thereby energized from the D.-C. source 12 in the substation, tripping all secondary breakers 11 and disconnecting all transformer banks of the feeder from the low-voltage mains 9.

It is clear that the rectifiers 15 may be connected in parallel, instead of series, in the pilot wire circuit, and/or the trip coils 42 may be connected in parallel.

In the event of a fault on primary feeder 4, there is no reversal from the normal relative polarity of current transformers 32 and 33 on the various transformer banks 8. There is, however, sufficient current supplied from current transformer 35 to operate inverse-time over-current relay 130.

The operation of relay 130 closes its contacts 131 and 133. The closing of contacts 133 energizes trip coil 73 which trips the feeder breaker 3 at the substation, and of contacts 131 energizes the trip coils 42 of all secondary breakers 11 as previously described for a fault in a transformer bank and the secondaries of all transformer banks 8 of the faulted feeder are disconnected from the secondary mains 9 by opening of the secondary breakers 11.

Fig. 12 is a full-line schematic diagram showing the pilot wire connections for a transformer bank of Fig. 11 for a three-phase circuit.

A harmonic filter, such as referred to in connection with Fig. 3, may be included in shunt with winding 71 of current-voltage transformer 70 in order to prevent operation of the protective system due to transient non-faulted conditions, and yet retain a high degree of sensitivity under local faults.

The two-way differential circuit between the primary and secondary sides of the transformer banks of Fig. 11 and the winding 71 of current-voltage transformer 70 may include the features (relay, fuse, etc.) as illustrated in single-line schematic diagrams of Figs. 4 and 5.

Thus the desired degree of sensitivity of the protective system on each transformer 8 to faults therein may be secured independently of the degree of sensitivity, determined by current transformer 35 and relay 130, to primary feeder faults.

The conversion of fault current in the individual transformer protective circuit to direct-current is advantageous in several respects, including a reduction in number and size of pilot wires.

In Fig. 13 there is illustrated a sectionalized loop distribution feeder similar to that illustrated in Fig. 1. The pilot wire system of Fig. 13 is also similar to Fig. 1 except that only one current transformer 33 is used in the transformer branch of the feeder section.

Current transformer 33 is located in the secondary leads of transformer bank 8. The secondary current of current transformer 33 is passed in series through winding 61 of the three-winding auxiliary transformer 60 and normally closed contacts 102 of relay 100. A second winding 62 of the three-winding auxiliary transformer 60 is connected to the main pilot wire circuit through wires 23. The ratio of windings 61 to 62 of auxiliary transformer 60 is such that under normal operating conditions, the current from current transformer 33 is reduced to a value equal to that required to maintain a three-way current balance with the other two branches of the feeder section. A third winding 63 of the three-winding auxiliary transformer is normally open circuited by the normally open contacts 101 of relay 100.

Relay 100 is operated by current output from current transformer 33 under certain fault conditions and upon a predetermined time-current characteristic to assure its operation in proper sequence relative to fuse 10 and primary sectionalizing breakers 6.

On primary feeder and transformer faults on the local unit section relay 100 operates prior to the blowing of fuse 10. On through faults external to a unit section relay 100 does not operate prior to the opening of sectionalizing breakers 6 of the faulted section.

A harmonic filter, such as the filter 78 of Fig. 3, under some conditions may be connected in shunt with the coil of relay 100 to safeguard against incorrect operation of the relay under transient conditions not due to a fault on the section.

Under the condition of normal operation or of through fault, the relative polarity of the current transformers 30, 31 and 33, and the auxiliary transformer 60, is such that a circulating current flows in the various branches of the pilot wire system with zero or negligible current in trip coils 40 and 41.

In the event of a fault anywhere within the feeder section, including the transformer bank 8, there is a reversal (or change) from the normal relative polarity of current transformers 30, 31 and 33 so that current will flow through trip coils 40 and 41.

In the case of a fault on the primary feeder, the current through the trip coils 40 and 41 will be sufficient to trip open the sectionalizing breakers 6 at each end of the faulted feeder section and clear the faulted feeder section from the primary supply prior to and without requiring the operation of relay 100. The circuit-interrupting device 10, which may be a fuse or circuit breaker operated by trip coils similarly to breakers 6, disconnects the faulted feeder section from the low-voltage network mains 9.

A transformer fault, as previously explained, produces a relatively lower fault current in the primary feeder than a fault on the primary feeder itself, and the current through the trip coils, due to a reversal of the normal relative polarity of current transformers 30, 31 and 33 may be less than the current required to operate the trip coils. Therefore, it is advantageous to obtain a boost in the trip-coil current over that obtained by the reversal of the normal relative polarity of the current transformers. This is accomplished by operation of relay 100 by the current output from current transformer 33.

Operation of relay 100 closes contacts 101 and opens contacts 102 (close before open). This operation of relay 100 places windings 61 and 63 in series across the secondary of current transformer 33. The ratio of windings 61 and 63 in series, to winding 62, is such that the current output of current transformer 33 is multiplied and fed into the pilot wire circuit over wires 23, 22 and 21 to operate trip coils 40 and 41 of feeder sectionalizing breakers 6.

The time-current characteristics of relay 100, fuse 10 if used, and fuses 14, are coordinated to assure the operation of relay 100 and blowing of fuse 10 prior to fuses 14 on primary feeder or transformer faults, and to assure the blowing of fuse 14 prior to fuse 10 or operation of relay 100 on a fault on a low-voltage main 9. On transformer faults, relay 100 must operate prior to the blowing of fuse 10, since, on such faults, the back feed from low-voltage mains 9 is the source of tripping energy to operate primary feeder sectionalizing breakers 6. Therefore relay 100 will also operate prior to blowing of fuse 10 in the case of primary feeder faults although not required under that fault condition.

Figure 14:
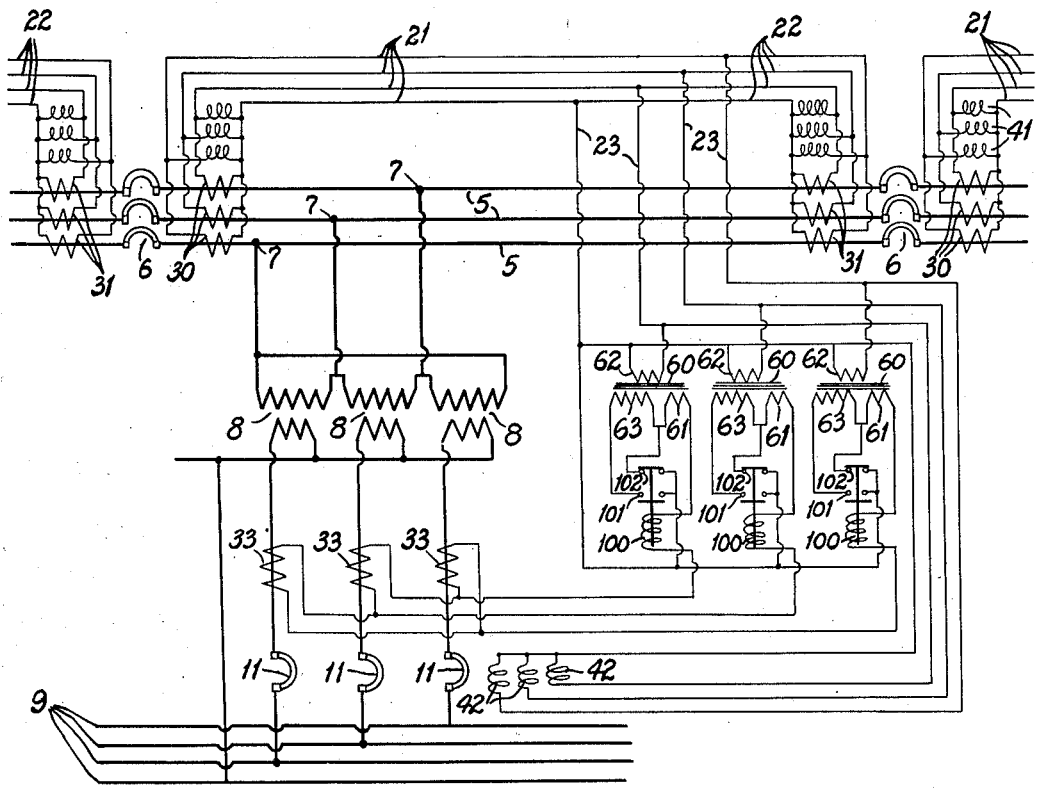
Fig. 14 is a full-line, three-phase, schematic diagram illustrating the pilot wire connections of a unit section of Fig. 13 for a three-phase delta-Y circuit.

Fig. 14 is a full-line schematic diagram showing the pilot wire connections of a unit section of Fig. 13 for a three-phase delta-Y circuit. The "overlapping" protection features of Fig. 2 may also be utilized.

In Fig. 15 there is illustrated a radial primary distribution feeder similar to that illustrated in Fig. 9. The pilot wire system of Fig. 15 is also similar to Fig. 9 except that only one current transformer 33 is used in each of the transformer branches of the feeder as in the case of the loop feeder of Fig. 13. The entire primary feeder and all of its associated transformer banks are protected by a multi-branch balanced circulating current pilot wire system.

Current transformer 35 is in the supply end of the feeder 4 and is connected to the pilot wires 44 and 45 which parallel the primary feeder. The secondary current of each current transformer 33 flows in series through winding 61 of a three-winding auxiliary transformer 60 and in series with winding and normally closed contacts 102 of relay 100. A second winding 62 of the three-winding auxiliary transformer 60 is connected to the main pilot wire circuit 44, 45 through wires 23. The ratios and relative polarities of current transformer 35, current transformers 33 and windings 61 to 62 of auxiliary transformer 60 are such that, under normal operating conditions, a current balance is maintained in the pilot wire circuit corresponding to the current in the main primary feeder and each of its branches to transformers 8. Winding 63 of the three-winding auxiliary transformer is normally open circuited by the normally open contacts 101 of relay 100.

Fig. 15 illustrates all trip coils 42 of secondary breakers 11, in series with pilot wire 43 and winding of relay 115 in the substation, connected across the main pilot wire circuit 44, 45. Alternatively, other connections and means of operating the trip coils may be used as described in connection with Fig. 9.

In the event of a fault on the primary feeder, there is a reversal (or change) from the normal relative polarities of current transformer 35 and current transformers 33 in the secondaries of transformer banks 8 connected to the faulted feeder. This reversal from normal relative polarity causes current to flow through winding of relay 115 in the substation and all trip coils 42 of secondary breakers 11, thus isolating the faulted feeder and all associated transformers from the substation supply and the low-voltage mains.

In the event of a fault in one of the transformer banks 8, there may be insufficient unbalance current on the pilot wire circuit to operate relay 115 and trip coils 42 under the conditions described above for the primary feeder fault. In this case, current from secondary of current transformer 33, reversed from normal direction due to back feed from low-voltage mains, causes the operation of relay 100 associated with the faulted transformer bank 8.

Operation of relay 100 closes contacts 101 and opens contacts 102 (close before open) and current from current transformer 33 flows through windings 61 and 63 of auxiliary transformer in series with winding of relay 150.

The ratio of windings 61 and 63 in series, to winding 62, is such that current output of current transformer 33 is multiplied and fed into the pilot wire circuit over wires 23, 44 and 45. Thereto are also added the current from current transformer 35 and from current transformers 33 (through windings 61 and 62 of their respective three-winding transformers 60) of other transformers 8 on the same feeder. The resultant current energizes and operates relay 115 in the substation and all trip coils 42 of secondary breakers 11, thereby isolating the entire primary feeders and all transformer banks of the feeder from the substation supply and low-voltage mains.

Alternatively to the current transformer (direct-trip) energization of the trip coils 42, tripping energy may be supplied from a central point, utilizing the methods illustrated in Fig. 10.

The time-current characteristics of relay 100 and fuses 14 are coordinated to assure the operation of relay 100 prior to fuses 14 on primary feeder or transformer faults, and to assure the blowing of fuse 14 prior to operation of relay 100 on a fault on a low-voltage main 9.

The purpose and operation of relay 150 is the same as previously described in connection with Fig. 9.

It is obvious that combinations of the various protective schemes and radial and loop feeders illustrated hereinabove may be utilized on the same distribution system; that feeders may be composite loop and radial; that there may be primary voltage ties between feeders; and that various means may be incorporated to afford remote indication of the operation and condition of circuit breakers, relays and pilot wires, and also means for remote closing and opening of circuit breakers or for their automatic reclosing.

It will be seen from the above that the balanced current transformers, such as 32 and 33 in Fig. 1, for example, are connected "aiding," that is, the voltages induced in their secondary windings by the current passing in their respective primary windings operate, under normal conditions, through the proper circuit to circulate current. Under this condition, the voltage across the wires is of a very low value, and is equivalent only to the impedance drop over the wires themselves, and the current through the wires varies normally with the primary current.

Under fault conditions, the relative polarity of the voltage which is induced in the respective current transformer secondary changes, that is, there is an opposing component, and the unbalance current passes through shunt paths, such as trip coils, relays, or boosting windings, such as 63 in Fig. 1, etc., for a circuit-interrupting purpose. It is apparent that under fault conditions the voltage between the wires may increase to appreciable values.

It will thus be understood that the essentials of the invention may be carried out by a balanced potential system, as well as by a balanced current system detailed. It is believed that this fact is clear to anyone skilled in the art, by reference to my Patent 1,543,370. In that patent, for example, Fig. 1 shows a pilot wire system having balanced current values. The objects sought by this Fig. 1 construction are analogously carried out by a balanced potential system shown in Fig. 6 of the patent. The difference is simply that in a balanced potential system the current transformer secondaries are connected so that under normal conditions the voltages induced in their secondary windings act opposite to each other. Therefore, under this condition there is zero or negligible current circulating in the pilot wire system, but there is substantial voltage across the pilot wires. The voltage across the pilot wires varies normally with the primary current. The effect is produced by connecting the trip coils, relays, and boosting windings in series with the current transformer secondaries. In such case, in the event of a fault, the potential balance is destroyed, and current flows through the pilot wire circuits, through the trip coils or boosting windings, to cause the opening of the necessary circuit-interrupting devices. Likewise, balanced potential feeder-responsive and tap-responsive circuits may be substituted herein for the analogous balanced current circuits disclosed.

Herein the term "closed circuit" refers both to circuits wherein closure is entirely effected conductively or inductively or both.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electric system comprising a feeder, a tap therefrom, a normally closed circuit-interrupting device, a protective system having a feeder-responsive portion associated with the circuit-interrupting device, a tap-responsive portion, the feeder-responsive portion being inductively coupled to the feeder and the tap-responsive portion being inductively coupled to the tap, means including a transformer portion for connecting said responsive portions adapted normally to maintain an electrical condition in said responsive portions to permit said circuit-interrupting device to remain closed, and adapted under conditions of fault on the feeder to permit a resulting current in the feeder-responsive portion to effect opening of said circuit-interrupting device, said connecting means being adapted to effect in response to a fault on the tap a value of current in the feeder-responsive portion for opening said circuit-interrupting device, said last-named current being greater than the value that it would have under conditions of fault of the same magnitude on the feeder.

2. An electric system comprising a feeder, a transformer tap from the feeder, at least one circuit-interrupting device in the feeder, an associated protective system having a feeder portion which is responsive to currents in the feeder, and having a tap portion which is responsive to currents in the transformer tap, the feeder portion being inductively coupled to the feeder and the tap portion being inductively coupled to the transformer tap, means for at least in part electromagnetically connecting said portions so that under conditions of feeder fault the resulting feeder current is adapted through the feeder portion of the protective system to open said circuit-interrupting device, said connecting means in the protective system being adapted to multiply in the feeder portion of the protective system the value of current in the tap portion of the protective system caused by a fault on the tap.

3. An electric system comprising a primary feeder, a transformer tap from the feeder, at least one circuit-interrupting device in the feeder, an associated protective system having a feeder portion which is responsive to current in the feeder and a tap portion which is responsive to current in the transformer tap, the feeder portion being inductively coupled to the feeder and the tap portion being inductively coupled to the transformer tap, means for electromagnetically connecting the feeder portion and the tap portion of the protective system so that under conditions of feeder fault the resulting change in feeder-portion current is adapted to open said circuit-interrupting device, said connecting means in the protective system being adapted to multiply in the feeder portion which is the value of current in the tap portion caused by a fault on the tap, whereby a tap fault which normally would produce a relatively lower current in the feeder portion than a fault of the same magnitude on the feeder itself, causes enough current flow in the feeder portion of the protective system also to open said circuit-interrupting device.

4. An electric system comprising a primary feeder, a transformer tapped to the feeder, at least one circuit-interrupting device in the feeder, a protective system having feeder and tap portions the former of which is inductively coupled to the feeder and the latter of which is inductively coupled to the transformer section, the feeder portion and the tap portion of the protective system being at least in part electromagnetically coupled so that under conditions of feeder fault the feeder current is adapted to open said circuit-interrupting device, said coupling means being adapted to multiply in the feeder portion of the protective system the effect of current in the tap portion, whereby a tap fault, which would produce a relatively lower current in the feeder portion than would a corresponding fault in the feeder itself, causes enough current in the feeder protective system also to open the circuit-interrupting device.

5. An electric system comprising a feeder, a transformer tap from the feeder, at least one circuit-interrupting device in the feeder, an associated protective system having a feeder portion which is responsive to currents in the feeder and a tap portion which is responsive to currents in the transformer tap, the feeder portion being inductively coupled to the feeder and the tap portion being inductively coupled to the transformer tap, means for electromagnetically connecting the feeder portion and the tap portion of the protective system so that under conditions of feeder fault the resulting feeder current is adapted through the feeder portion of the protective system to open said circuit-interrupting device, said connecting means in the protective system being adapted to multiply in the feeder portion of the protective system the effect of current in the tap portion of the protective system caused by a fault in the tap, said connecting means comprising a three-winding transformer in which one winding is in the feeder portion of the protective system, another winding is in series with the tap portion of the protective system and the third winding is connected to the tap portion in such a way as to be activated under tap fault conditions.

6. An electric distribution system comprising a primary feeder, a transformer section tapped to the feeder, protective means responsive with a relatively low degree of sensitivity to a feeder fault to open the feeder, said protective means comprising a feeder-responsive portion inductively coupled with the feeder, a transformer section-responsive portion inductively coupled with the transformer section and being responsive with a relatively high degree of sensitivity to a fault in the transformer section also to open the feeder, the transformer section-responsive portion having a normal current balance within itself.

7. An electric distribution system comprising a primary feeder, a transformer section tapped to the feeder, protective means comprising a circuit having two parts coupled, one of said parts being electromagnetically coupled with the transformer section and the other part being electromagnetically coupled with the primary feeder, said protective means being responsive with a relatively low degree of sensitivity to a feeder fault to disconnect the feeder and with a relatively high degree of sensitivity to a fault in the transformer section also to disconnect the feeder, said two parts being coupled through means, a part of which means is operable under normal conditions in the transformer section and another part of which is operable only under fault conditions in the transformer section.

8. An electric protective system comprising a loop feeder, a section in said feeder, trip means at the ends of the section adapted to cut out said section, a tap connected to said section, a transformer in the tap having primary and secondary sides, a first differential circuit having inductive connections with the primary and secondary sides of said transformer, and a second differential circuit having inductive connections with the two end portions of said feeder section, means inductively connecting the two differential circuits comprising a three-winding transformer in which one winding is in the second differential circuit and in which another wnding is in series with the inductive connections of the first differential circuit, the third winding being connected across points of normal equal potential in said first differential circuit, said points being of unequal potential under fault conditions in the tap.

9. An electric protective system comprising a feeder, trip means adapted to cut off said feeder, a tap connected to said feeder, a transformer in the tap having primary and secondary sides, a first differential circuit having inductive connections with the primary and secondary sides of said transformer, and a second differential circuit having an inductive connection with the feeder, means connecting the two differential circuits comprising a three-winding transformer in which one winding is in the second differential circuit and in which another winding is in series with the inductive connections of the first differential circuit, the third winding being connected across points of normal equal potential in said first differential circuit, said points being of unequal potential under fault conditions in the tap.

10. An electric protective system comprising a loop feeder, a section in said feeder, trip means at the ends of the section adapted to cut out said section, a tap connected to said section, a transformer in the tap having primary and secondary sides, a first differential circuit having inductive connections with the primary and secondary sides of said transformer, and a second differential circuit having inductive connections with the two end portions of said feeder section, means connecting the two differential circuits comprising a three-winding transformer in which one winding is in the second differential circuit and in which another winding is in series with the inductive connections of the first differential circuit, the third winding being connected directly and exclusively across points of normal equal potential in said first differential circuit, said points being of unequal potential under fault conditions in the tap.

11. An electric protective system comprising a feeder, trip means adapted to cut off said feeder, a tap connected to said feeder, a transformer in the tap having a secondary side, a tap-responsive circuit having an inductive connection with the secondary side of the transformer, a feeder-responsive circuit having an inductive connection with the feeder, means connecting the two responsive circuits comprising a three-winding transformer in which one winding is in the feeder-responsive circuit and another winding is in series with the tap-responsive circuit, the third winding being in a normally open connection in series with the second winding, and relay means in series in said tap-responsive circuit to close the connection through the third winding under abnormal conditions in the tap.

12. An electric protective system comprising a feeder, a tap connected to the feeder, a tap-responsive circuit having an inductive connection with the tap and a feeder-responsive circuit having an inductive connection with the feeder, means inductively connecting said tap-responsive and feeder-responsive circuits comprising a three-winding transformer in which a first primary winding is in the tap-responsive circuit and in which a secondary winding is in the feeder-responsive circuit and in which a second primary winding is connected in the tap-responsive circuit, the normal electrical conditions of said tap-responsive and feeder-responsive circuits being such that said second primary winding is substantially inactive but under abnormal tap conditions being such that said second primary winding becomes active to increase the ratio of current flow in the feeder-responsive circuit with respect to current flow in the tap-responsive circuit.

13. An electric protective system comprising a feeder, a tap connected to the feeder, a tap-responsive circuit having an inductive connection with the tap and a feeder-responsive circuit having an inductive connection with the feeder, means inductively connecting said tap-responsive and feeder-responsive circuits comprising a three-winding transformer in which a first primary winding is in the tap-responsive circuit and in which a secondary winding is in the feeder-responsive circuit and in which a second primary winding is connected in the tap-responsive circuit, the normal electrical conditions of said tap-responsive and feeder-responsive circuits being such that said second primary winding is substantially inactive but under abnormal tap conditions being such that said second primary winding becomes active to increase the ratio of current flow in the feeder-responsive circuit with respect to current flow in the tap-responsive circuit, said tap-responsive circuit being arranged with respect to the tap so that under fault conditions in the feeder only said second primary winding remains substantially inactive.

14. An electric protective system comprising a feeder, trip means in the feeder, a tap connected to the feeder, a feeder-responsive circuit adapted to operate said trip means, a tap-responsive circuit, said feeder-responsive and tap-responsive circuits having a connection which is at least in part electromagnetic and adapted to maintain a normal condition of electrical balance in said responsive circuits so that under normal feeder and tap conditions the trip means remains closed, said tap-responsive portion being adapted to become electrically unbalanced in response to tap fault to cause current flow, and said connection having a portion responsive to said flow to effect a multiplied flow condition in the feeder-responsive portion to operate said trip means.

15. In an electric protective system, a loop circuit, a feeder section in said circuit, circuit breakers at each end of the section for disconnection, a tap connected to the section, a transformer having a primary and a secondary in said tap, a two-way balanced differential circuit inductively connected both with the primary and secondary sides of the transformer, a two-way balanced differential circuit inductively connected to the two ends of the feeder section and associated with said circuit breakers for operating them, said two, two-way differential circuits being inductively connected, the inductive connection comprising a three-winding current transformer.

16. In an electric protective system, a loop circuit, a section in said circuit, circuit breakers at each end of the section for disconnection, a tap connected to the section, a transformer having a primary and a secondary in said tap, a two-way balanced differential circuit inductively connected both with the primary and secondary sides of the transformer, a two-way balanced differential circuit inductively connected to the two ends of the feeder section, said two, two-way differential circuits being inductively connected, the last-named inductive connection comprising a three-winding current transformer, a primary winding of said three-winding transformer being in the first-named differential circuit and a second winding in the second-named differential circuit, the third winding being connected across normally equi-potential points in the first-named differential circuit, balanced current conditions being normally maintained in the first-named differential circuit with balanced voltage conditions across the third winding of the three-winding transformer, but being abnormally unbalanced whereby current flows through said third winding, the ratio of the third winding to the second winding being higher than the ratio of the first winding to the second winding of said three-winding current transformer.

17. In an electric protective system, a two-way balanced circuit responsive to a feeder section, a second two-way balanced circuit responsive to conditions in a transformer tap section attached to said feeder section, said balanced circuits being at least in part electromagnetically connected.

18. In an electric protective system, a feeder, a tap connected thereto, an interrupter in the feeder, a two-way balanced circuit responsive to the feeder and adapted to activate the interrupter, a second two-way balanced circuit responsive to conditions in the tap section, said balanced circuits being electromagnetically connected in such a way that under normal conditions the interrupter is not activated but under abnormal conditions in the feeder or tap effectively activating the interrupter.

19. In an electric protective system, a feeder, a tap connected to the feeder, a transformer in the tap having a secondary side, a feeder-responsive circuit, a tap-responsive circuit having an inductive connection only with the secondary side of the transformer, a three-winding transformer providing an inductive connection between said feeder-responsive and said tap-responsive circuits, said three-winding transformer having a first winding in the tap-responsive circuit, a relay having contact means causing said first winding of the three-winding transformer normally to be in series with the inductive connection with the tap, said relay having a winding also normally in the same series connection, a second winding in the three-winding transformer which is located in the feeder-responsive circuit, and a third winding in said three-winding transformer which is in a normally open-circuit connection in the tap-responsive circuit, said relay under fault conditions in the tap being adapted to close the connection of said third winding.

20. In a tap from an electric power feeder to another circuit, a feeder protective circuit, an auxiliary circuit, a plurality of current transformers in said auxiliary circuit and energized from said tap, a series connection between said transformers, current-ratio changing means associated with said current transformers having one element in series with said current transformers and another element adapted for a higher ratio in shunt with said current transformers, said series and shunt elements being connected at least in part electromagnetically to said feeder protective circuit.

PHILIP H. CHASE.